United States Patent
Holmgren et al.

(10) Patent No.: US 12,502,355 B2
(45) Date of Patent: Dec. 23, 2025

(54) SOLID PHARMACEUTICAL FORMULATIONS OF 6-(2-CHLORO-6-METHYLPYRIDIN-4-YL)-5-(4-FLUOROPHENYL)-1,2,4-TRIAZIN-3-AMINE

(71) Applicant: AstraZeneca AB, Södertälje (SE)

(72) Inventors: Anders Holmgren, Södertälje (SE); Annika Kyssä, Södertälje (SE); Christian Von Corswant, Södertälje (SE); Urban Skantze, Södertälje (SE)

(73) Assignee: ASTRAZENECA AB, Södertälje (SE)

( * ) Notice: Subject to any disclaimer, the term of this patent is extended or adjusted under 35 U.S.C. 154(b) by 707 days.

(21) Appl. No.: 17/756,720

(22) PCT Filed: Dec. 1, 2020

(86) PCT No.: PCT/EP2020/084160
§ 371 (c)(1),
(2) Date: Jun. 1, 2022

(87) PCT Pub. No.: WO2021/110697
PCT Pub. Date: Jun. 10, 2021

(65) Prior Publication Data
US 2023/0000775 A1    Jan. 5, 2023

Related U.S. Application Data

(60) Provisional application No. 62/942,417, filed on Dec. 2, 2019.

(51) Int. Cl.
*A61K 9/16* (2006.01)
*A61K 9/20* (2006.01)
*A61K 9/48* (2006.01)
*A61K 31/53* (2006.01)
*A61K 47/14* (2017.01)

(52) U.S. Cl.
CPC .......... *A61K 9/1676* (2013.01); *A61K 9/2013* (2013.01); *A61K 9/4808* (2013.01); *A61K 31/53* (2013.01); *A61K 47/14* (2013.01)

(58) Field of Classification Search
CPC .. A61K 9/1676; A61K 9/2013; A61K 9/4808; A61K 31/53; A61K 47/14
See application file for complete search history.

(56) References Cited

FOREIGN PATENT DOCUMENTS

| | | |
|---|---|---|
| CN | 101516870 A | 8/2009 |
| CN | 104936589 A | 9/2015 |
| CN | 107529758 A | 1/2018 |
| WO | 2011095625 A1 | 8/2011 |
| WO | WO 2011/131943 A2 | 10/2011 |
| WO | WO 2015/152544 A1 | 10/2015 |
| WO | 2018237157 A1 | 12/2018 |
| WO | 2020065036 A1 | 4/2020 |

*Primary Examiner* — Robert A Wax
*Assistant Examiner* — Olga V. Tcherkasskaya
(74) *Attorney, Agent, or Firm* — Finnegan, Henderson, Farabow, Garrett & Dunner, LLP

(57) ABSTRACT

Solid pharmaceutical formulations including AZD4635 are described. The solid formulations can include a polymeric stabilizer (e.g., a polyvinylpyrollidone), an ionic surfactant (e.g., sodium docusate), and a non-ionic surfactant (e.g., a poloxamer).

16 Claims, 8 Drawing Sheets

SOLID PHARMACEUTICAL FORMULATIONS OF 6-(2-CHLORO-6-METHYLPYRIDIN-4-YL)-5-(4-FLUOROPHENYL)-1,2,4-TRIAZIN-3-AMINE

Adenosine modulates of a number of physiological functions. Intracellularly, adenosine is involved in energy metabolism, nucleic acid metabolism, and the methionine cycle; extracellular adenosine engages in intercellular signaling. For example, extracellular adenosine is a potent immunosuppressor, preventing an overzealous immune response during inflammation and infection. Adenosine also acts on other systems, including the cardiovascular system, and the central nervous system.

The action of adenosine is mediated by a family of G-protein coupled receptors. At least four subtypes of adenosine receptors have been identified: A1R, A2aR, A2bR, and A3R. The A1R and A3 subtypes inhibit the activity of the enzyme adenylate cyclase, whereas the A2a and A2b subtypes stimulate the activity of the same enzyme, thereby modulating the level of cyclic AMP in cells.

In the immune system, engagement of A2a and A2b adenosine receptors is a critical regulatory mechanism that protects tissues against excessive immune reactions. In tumors, this pathway is hijacked and hinders antitumor immunity, promoting cancer progression. Furthermore, in many cases, the tumor microenvironment contains high levels of extracellular adenosine. Thus, the adenosine receptor, notably A2aR and A2bR, have been identified as targets for cancer therapies.

Compound 1, 6-(2-chloro-6-methylpyridin-4-yl)-5-(4-fluorophenyl)-1,2,4-triazin-3-amine, has the following structure:

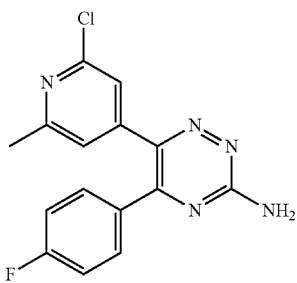 [SMILES: Cc1cc(-c2nnc(N)nc2-c2ccc(F)cc2)cc(Cl)n1]

and is disclosed in WO 2011/095625. Compound 1 is a potent A2aR antagonist in clinical trials for treatment of cancer. Compound 1 is also known as AZD4635 or HTL-1071.

Compound 1 is weakly basic, with the triazine moiety demonstrating a pKa of 1.78. Its log P value is 2.8. In aqueous media, Compound 1 is poorly soluble, with solubilities ranging from less than 5 µg/mL at neutral pH to 29.8 µg/mL at pH 1.2; in simulated fasted intestinal fluid, the solubility is 5.8 µg/mL.

Due to its poor solubility, the bioavailability of Compound 1 is limited. It can be formulated as a powder for dosing in a mix-and-drink form. However, mix-and-drink formulations suffer from relative complexity of dosing and an unpleasant experience for the patient. Accordingly, there remains a need for a solid pharmaceutical formulation of Compound 1 which provides ease of dosing while maintaining suitable pharmacokinetic properties.

In one aspect, a solid pharmaceutical formulation comprises a plurality of microcrystalline cellulose (MCC) pellets each individually coated with a composition comprising: 6-(2-chloro-6-methylpyridin-4-yl)-5-(4-fluorophenyl)-1,2,4-triazin-3-amine; a polymeric stabilizer; an ionic surfactant; and a non-ionic surfactant.

The polymeric stabilizer can include polyvinylpyrrolidone (PVP).

The ionic surfactant can include sodium docusate.

The non-ionic surfactant can include a poloxamer or a polyethylene glycolated (PEGylated) phospholipid.

In some embodiments, the polymeric stabilizer can include polyvinylpyrrolidone, the ionic surfactant can include sodium docusate, and the non-ionic surfactant can include a poloxamer or a PEGylated phospholipid.

The polymeric stabilizer can be polyvinylpyrrolidone K-30.

The ionic surfactant can be sodium docusate.

The non-ionic surfactant can be poloxamer 407, which is a triblock copolymer comprising a central polyoxypropylene block flanked by two polyoxyethylene blocks, wherein the copolymer comprises approximately 4000 g/mol polyoxypropylene and approximately 70% polyoxyethylene.

In some embodiments, the polymeric stabilizer can be polyvinylpyrrolidone K-30, the ionic surfactant can be sodium docusate, and the non-ionic surfactant can be poloxamer 407.

The composition can further comprise trehalose.

The composition can comprise, on a w/w % basis: from 20 to 75% of 6-(2-chloro-6-methylpyridin-4-yl)-5-(4-fluorophenyl)-1,2,4-triazin-3-amine.

The composition can comprise, on a w/w % basis: from 1 to 20% of polyvinylpyrrolidone K-30.

The composition can comprise, on a w/w % basis: from 0.01 to 1.00% of sodium docusate.

The composition can comprise, on a w/w % basis: from 20 to 60% of poloxamer 407.

In some embodiments, the composition can comprise, on a w/w % basis: from 20 to 75% of 6-(2-chloro-6-methylpyridin-4-yl)-5-(4-fluorophenyl)-1,2,4-triazin-3-amine; from 1 to 20% of polyvinylpyrrolidone K-30; from 0.01 to 1.00% of sodium docusate; and from 20 to 60% of poloxamer 407.

The formulation can include, on a w/w % basis: from 10 to 50% of microcrystalline cellulose.

The formulation can include, on a w/w % basis: from 20 to 50% of 6-(2-chloro-6-methylpyridin-4-yl)-5-(4-fluorophenyl)-1,2,4-triazin-3-amine.

The formulation can include, on a w/w % basis: from 0.1 to 10% of polyvinylpyrrolidone K-30.

The formulation can include, on a w/w % basis: from 0.01 to 1.00% of sodium docusate.

The formulation can include, on a w/w % basis: from 10 to 40% of poloxamer 407.

In some embodiments, the formulation includes, on a w/w % basis: from 10 to 50% of microcrystalline cellulose; from 20 to 50% of 6-(2-chloro-6-methylpyridin-4-yl)-5-(4-fluorophenyl)-1,2,4-triazin-3-amine; from 0.1 to 10% of polyvinylpyrrolidone K-30; from 0.01 to 1.00% of sodium docusate; and from 10 to 40% of poloxamer 407.

The formulation can further comprise a lubricant. The lubricant can include sodium stearyl fumarate (SSF).

The formulation can include, on a w/w % basis: from 25 to 40% of microcrystalline cellulose.

The formulation can include, on a w/w % basis: from 25 to 45% of 6-(2-chloro-6-methylpyridin-4-yl)-5-(4-fluorophenyl)-1,2,4-triazin-3-amine.

The formulation can include, on a w/w % basis: from 3 to 7% of PVP K30.

The formulation can include, on a w/w % basis: from 0.05 to 0.50% of sodium docusate.

The formulation can include, on a w/w % basis: from 15 to 35% of poloxamer 407.

The formulation can include, on a w/w % basis: from 0.01 to 0.5% of sodium stearyl fumarate.

In some embodiments, the formulation can include, on a w/w % basis: from 25 to 40% of microcrystalline cellulose; from 25 to 45% of 6-(2-chloro-6-methylpyridin-4-yl)-5-(4-fluorophenyl)-1,2,4-triazin-3-amine; from 3 to 7% of PVP K30; from 0.05 to 0.50% of sodium docusate; from 15 to 35% of poloxamer 407; and from 0.01 to 0.5% of sodium stearyl fumarate.

The formulation can include, on a w/w % basis: from 30 to 35% of microcrystalline cellulose.

The formulation can include, on a w/w % basis: from 33 to 39% of 6-(2-chloro-6-methylpyridin-4-yl)-5-(4-fluorophenyl)-1,2,4-triazin-3-amine.

The formulation can include, on a w/w % basis: from 4.2 to 5.2% of PVP K30.

The formulation can include, on a w/w % basis: from 0.2 to 0.3% of sodium docusate.

The formulation can include, on a w/w % basis: from 22 to 28% of poloxamer 407.

The formulation can include, on a w/w % basis: from 0.15 to 0.25% of sodium stearyl fumarate.

In some embodiments, the formulation can include, on a w/w % basis: from 30 to 35% of microcrystalline cellulose; from 33 to 39% of 6-(2-chloro-6-methylpyridin-4-yl)-5-(4-fluorophenyl)-1,2,4-triazin-3-amine; from 4.2 to 5.2% of PVP K30; from 0.2 to 0.3% of sodium docusate; from 22 to 28% of poloxamer 407; and from 0.15 to 0.25% of sodium stearyl fumarate.

In another aspect, a solid pharmaceutical formulation comprises a plurality of microcrystalline cellulose pellets each individually coated with a composition, wherein the composition consists essentially of, on a w/w % basis: 54.44% of 6-(2-chloro-6-methylpyridin-4-yl)-5-(4-fluorophenyl)-1,2,4-triazin-3-amine; 7.08% of PVP K30; 0.38% of sodium docusate; and 38.1% of poloxamer 407.

In another aspect, a solid pharmaceutical formulation comprises 6-(2-chloro-6-methylpyridin-4-yl)-5-(4-fluorophenyl)-1,2,4-triazin-3-amine wherein an oral dose of 50 mg 6-(2-chloro-6-methylpyridin-4-yl)-5-(4-fluorophenyl)-1,2,4-triazin-3-amine to a human subject provides an $AUC_{0-48}$ of 1850 ng·h/mL±30%. This solid pharmaceutical formulation can comprise a plurality of microcrystalline cellulose pellets each individually coated with a composition comprising: 6-(2-chloro-6-methylpyridin-4-yl)-5-(4-fluorophenyl)-1,2,4-triazin-3-amine; a polymeric stabilizer; an ionic surfactant; and a non-ionic surfactant. The polymeric stabilizer can include polyvinylpyrrolidone. The ionic surfactant can include sodium docusate. The non-ionic surfactant can include a poloxamer or a PEGylated phospholipid. In some embodiments, the polymeric stabilizer can include polyvinylpyrrolidone, the ionic surfactant can include sodium docusate, and the non-ionic surfactant can include a poloxamer or a PEGylated phospholipid. In some embodiments, the formulation includes, on a w/w % basis: from 10 to 50% of microcrystalline cellulose; from 20 to 50% of 6-(2-chloro-6-methylpyridin-4-yl)-5-(4-fluorophenyl)-1,2,4-triazin-3-amine; from 0.1 to 10% of polyvinylpyrrolidone K-30; from 0.01 to 1.00% of sodium docusate; and from 10 to 40% of poloxamer 407.

In another aspect, a solid pharmaceutical formulation comprises 6-(2-chloro-6-methylpyridin-4-yl)-5-(4-fluorophenyl)-1,2,4-triazin-3-amine wherein an oral dose of 50 mg 6-(2-chloro-6-methylpyridin-4-yl)-5-(4-fluorophenyl)-1,2,4-triazin-3-amine to a human subject provides a $C_{max}$ of 352 ng/mL±30%. This solid pharmaceutical formulation can comprise a plurality of microcrystalline cellulose pellets each individually coated with a composition comprising: 6-(2-chloro-6-methylpyridin-4-yl)-5-(4-fluorophenyl)-1,2,4-triazin-3-amine; a polymeric stabilizer; an ionic surfactant; and a non-ionic surfactant. The polymeric stabilizer can include polyvinylpyrrolidone. The ionic surfactant can include sodium docusate. The non-ionic surfactant can include a poloxamer or a PEGylated phospholipid. In some embodiments, the polymeric stabilizer can include polyvinylpyrrolidone, the ionic surfactant can include sodium docusate, and the non-ionic surfactant can include a poloxamer or a PEGylated phospholipid. In some embodiments, the formulation includes, on a w/w % basis: from 10 to 50% of microcrystalline cellulose; from 20 to 50% of 6-(2-chloro-6-methylpyridin-4-yl)-5-(4-fluorophenyl)-1,2,4-triazin-3-amine; from 0.1 to 10% of polyvinylpyrrolidone K-30; from 0.01 to 1.00% of sodium docusate; and from 10 to 40% of poloxamer 407.

In another aspect, a solid pharmaceutical formulation comprises 6-(2-chloro-6-methylpyridin-4-yl)-5-(4-fluorophenyl)-1,2,4-triazin-3-amine wherein an oral dose of 50 mg 6-(2-chloro-6-methylpyridin-4-yl)-5-(4-fluorophenyl)-1,2,4-triazin-3-amine to a human subject provides an $AUC_{0-48}$ of 1850 ng·h/mL±30% and a $C_{max}$ of 352 ng/mL±30%. This solid pharmaceutical formulation can comprise a plurality of microcrystalline cellulose pellets each individually coated with a composition comprising: 6-(2-chloro-6-methylpyridin-4-yl)-5-(4-fluorophenyl)-1,2,4-triazin-3-amine; a polymeric stabilizer; an ionic surfactant; and a non-ionic surfactant. The polymeric stabilizer can include polyvinylpyrrolidone. The ionic surfactant can include sodium docusate. The non-ionic surfactant can include a poloxamer or a PEGylated phospholipid. In some embodiments, the polymeric stabilizer can include polyvinylpyrrolidone, the ionic surfactant can include sodium docusate, and the non-ionic surfactant can include a poloxamer or a PEGylated phospholipid. In some embodiments, the formulation includes, on a w/w % basis: from 10 to 50% of microcrystalline cellulose; from 20 to 50% of 6-(2-chloro-6-methylpyridin-4-yl)-5-(4-fluorophenyl)-1,2,4-triazin-3-amine; from 0.1 to 10% of polyvinylpyrrolidone K-30; from 0.01 to 1.00% of sodium docusate; and from 10 to 40% of poloxamer 407.

In another aspect, a solid unit dosage form of 6-(2-chloro-6-methylpyridin-4-yl)-5-(4-fluorophenyl)-1,2,4-triazin-3-amine includes 1 to 200 mg of 6-(2-chloro-6-methylpyridin-4-yl)-5-(4-fluorophenyl)-1,2,4-triazin-3-amine in a gelatin capsule. The solid unit dosage form of 6-(2-chloro-6-methylpyridin-4-yl)-5-(4-fluorophenyl)-1,2,4-triazin-3-amine can include 50, 75, or 100 mg of 6-(2-chloro-6-methylpyridin-4-yl)-5-(4-fluorophenyl)-1,2,4-triazin-3-amine.

Other features, objects, and advantages will be apparent from the description and drawings, and from the claims.

FIG. 5 is a process flow chart for preparation of capsules, e.g., of Formulation 8a.

Figure 1:
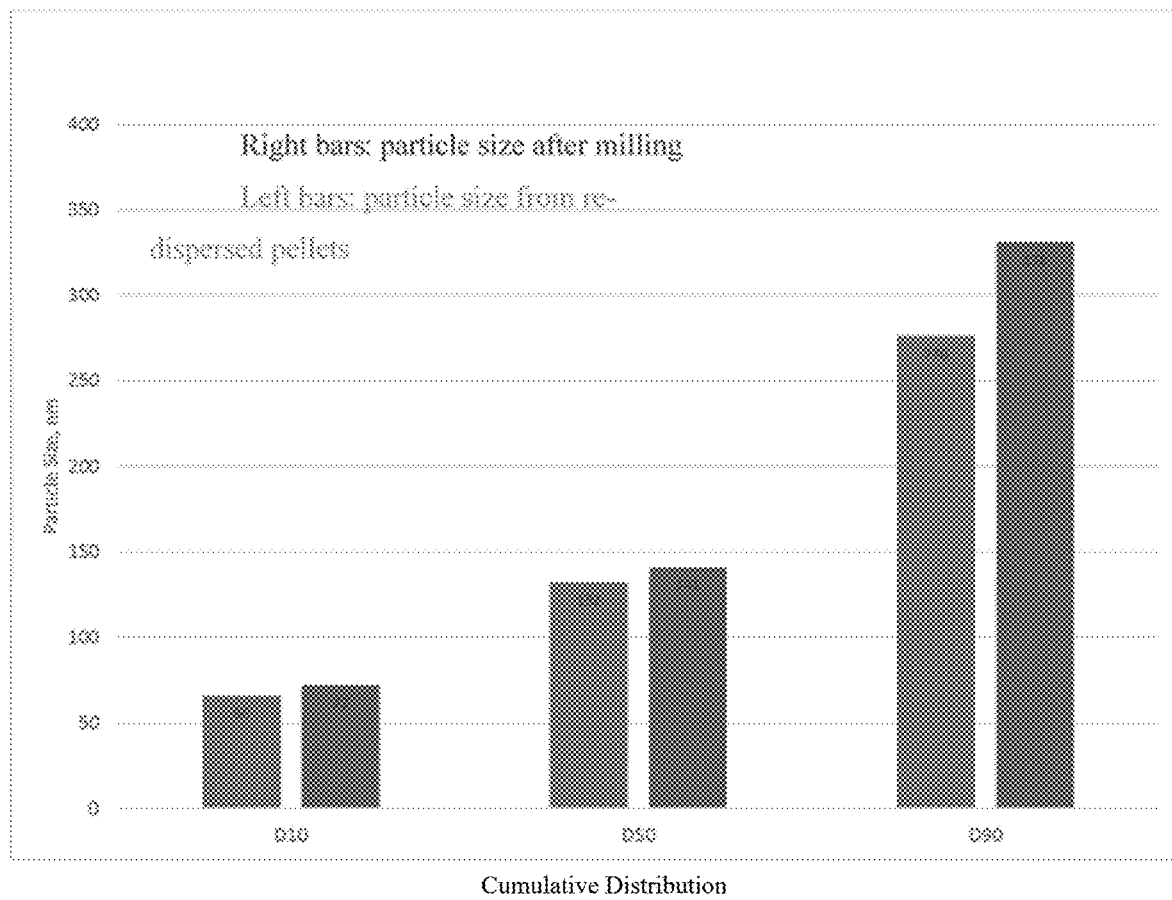
FIG. 1 is a graph showing particle size distributions for milled (right bars) and re-dispersed (left bars) active pharmaceutical ingredient (API).

Described herein are solid pharmaceutical formulations of Compound 1. The solid pharmaceutical formulations are suitable for oral dosing and provide suitable qualities, e.g., dissolution and absorption so as to afford desired pharmacokinetic behavior in subjects.

The inventors investigated multiple strategies to make an effective solid formulation, including:

- Conventional immediate release tablets. Overall drug exposure was limited by low solubility of Compound 1; not considered feasible.
- Salt form/co-crystal: Salt screen only showed formation of salt with strong acids which then rapidly dissociated on contact with water. Screen of co-crystal former molecules was unsuccessful in identifying a suitable co-crystal form.
- Lipid formulation: Compound 1 is a neutral molecule, and not lipophilic. Lipidic screen did not show significant solubility in suitable excipients for making a true lipidic formulation.
- Mesoporous silica formulation: Such formulations require adequate solubility of API in suitable solvent and amorphous stability. Solubility of Compound 1 inadequate.
- Spray-dried amorphous solid dispersion: Compound 1 has limited solubility in solvents suitable for spray drying.
- Hot melt extruded amorphous solid dispersion: Screening demonstrated stability of such solid dispersions at low drug loading levels. Microdissolution and dissolution showed increased and sustained release of Compound 1 compared to crystalline Compound 1.
- Crystalline nanoparticles: Nanocrystalline Compound 1 coated on an insoluble core. Demonstrated enhanced dissolution rate by increasing surface area.

Hot melt extrusion amorphous solid dispersion formulations and crystalline nanoparticle formulations were further developed as described below.

Example 1: Phase 1a Formulation

For Phase 1a studies, a mix-and-drink formulation (Formulation 1) was developed. Compound 1 was wet bead milled to achieve sub-micron particle size. A range of polymeric, non-ionic and ionic surfactant/nanosuspension stabilising systems were evaluated. Spray drying was chosen as the method to transform the nanosuspension into a solid product. Sucrose was added to the nanosuspension formulation prior to spray drying as a matrix former, to prevent agglomeration of the API nanoparticles and maintain the rapid dissolution characteristics of the particles on reconstitution of the suspension. A 1.0% w/w suspension was developed for use in the spray drying process to yield a 5.5% w/w Compound 1 powder for oral suspension. The dried powder was reconstituted in water containing 2 mg/mL simethicone before dosing.

TABLE 1

| Formulation 1 (nanosuspension) | | |
| --- | --- | --- |
| Component | % w/w | Function |
| Compound 1 | 5.5 | Drug substance |
| HPMC | 27.6 | Polymeric stabilizer |

TABLE 1-continued

| Formulation 1 (nanosuspension) | | |
| --- | --- | --- |
| Component | % w/w | Function |
| sucrose | 38.7 | Matrix former |
| docusate sodium | 0.6 | Surfactant |
| Poloxamer 188 | 27.6 | Surfactant |

Example 2: Formulation 2 Nanosuspension

Example 2A: Feasibility Study

A slurry was made by first adding sodium docusate then dissolving PVP K30, then adding Compound 1, followed by milling in a planetary ceramic vessel mill into a nano-sized suspension. See FIG. 1. This experiment showed that it was possible to mill Compound 1 to nanosize particles with this formulation.

TABLE 2

| Formulation 2 (nanosuspension) | | | |
| --- | --- | --- | --- |
| Milled suspension composition (dry based) | % w/w | Pellet coating composition (dry based) | % w/w |
| Compound 1 | 87.2 | Compound 1 | 46.6 |
| PVP K30 | 12.2 | PVP K30 | 6.5 |
| Docusate Sodium | 0.6 | Docusate Sodium | 0.3 |
| | | Solid matrix former (Trehalose or PVP K17) | 46.6 |

It also proved it was possible (but with process difficulties) to spraycoat the suspension on MCC cores using trehalose as matrix former. Redispersion of spraycoated pellets showed the same particle size distribution as postmilled suspension.

Example 2B: Particle Size Distribution

Figure 2:
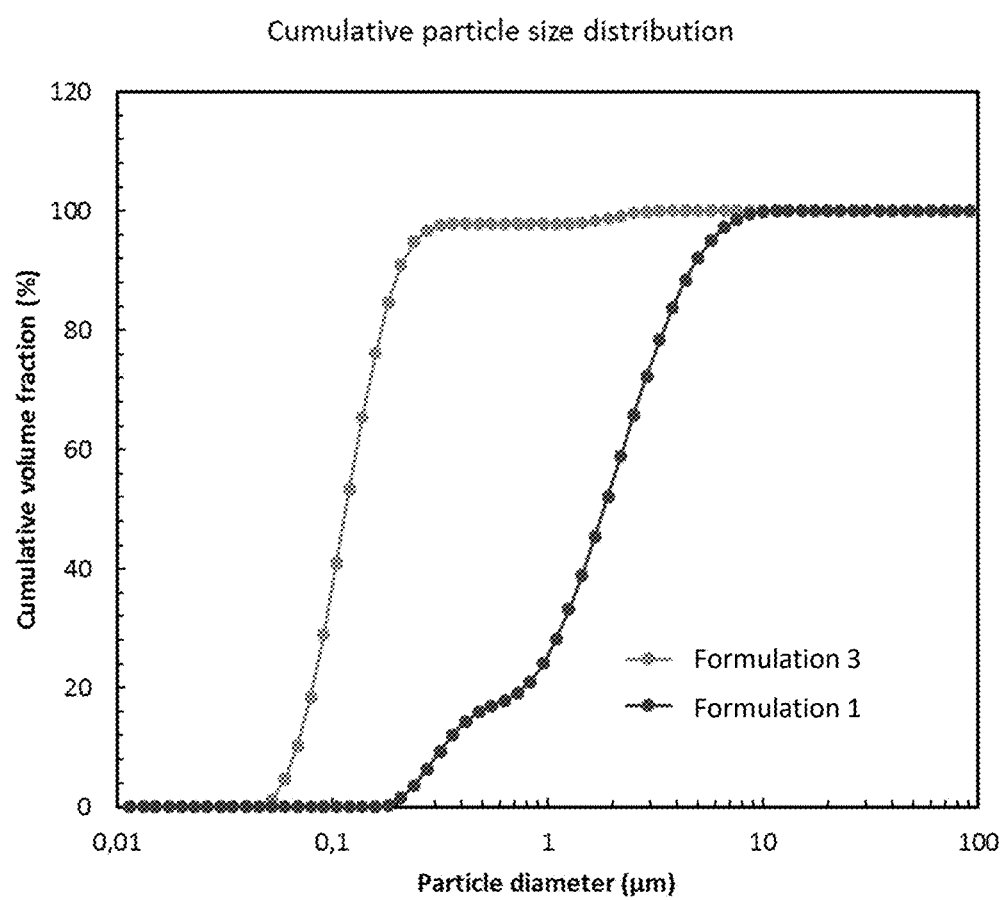
FIG. 2 is a graph showing particle size distributions for two different nanosuspension formulations.

Particle size distributions for nanosuspensions of Formulation 3 and Formulation 1 were compared. See FIG. 2. Formulation 3 had a smaller average size and was more monodisperse than Formulation 1.

TABLE 3

| Formulation 3 (nanosuspension) | | |
| --- | --- | --- |
| Component | % w/w | Function |
| Compound 1 | 78.8 | Drug substance |
| PVP | 5.1 | Polymeric stabilizer |
| Docusate sodium | 0.3 | surfactant |
| DSPE-PEG2000 | 15.8 | surfactant |

Formulation 3 was found to dissolve rapidly (>90% in 10 min) and completely (98%) under USP2 conditions, pH 1.2, 2% SDS, 50 rpm, using 100 mg of Compound 1.

Example 2C: Extrudate

Figure 3:
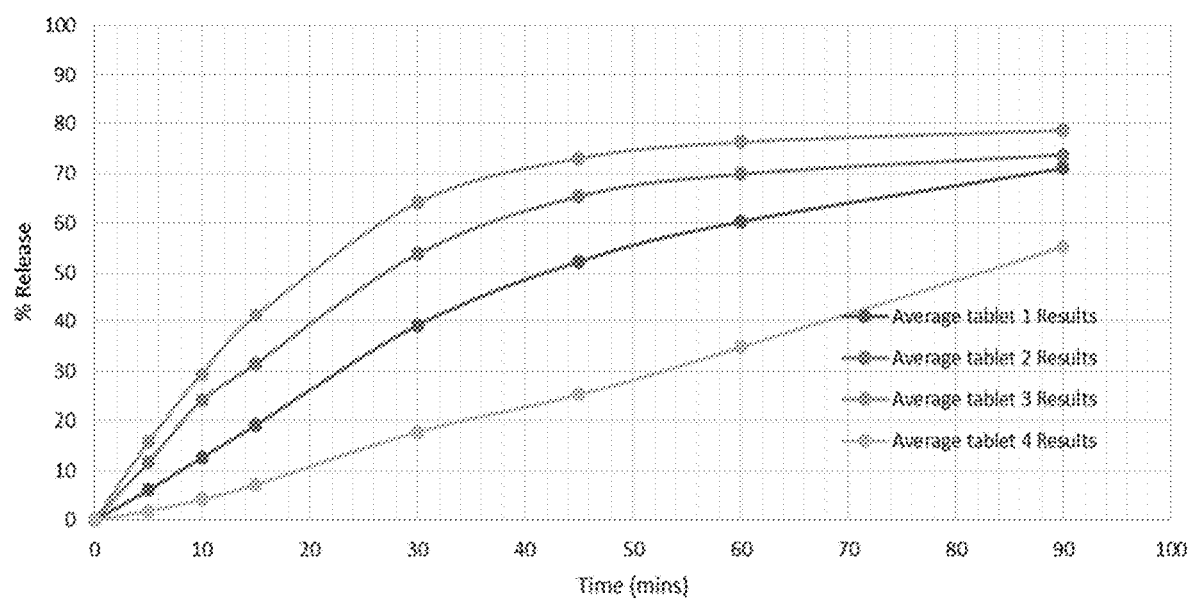
FIG. 3 is a graph showing % release of API from four different tablet formulations.

A series of extrudate tablet formulations according to Tables 4A-4D were prepared. Dissolution profiles in Fasted state simulated intestinal fluid (FaSSIF V2) of corresponding Tablets 1-4 are shown in FIG. 3.

TABLE 4A

| Formulation 4A (Tablet 1) | | |
|---|---|---|
| Component | % w/w | Function |
| Extrudate (15:85 Compound 1:Soluplus) | 50 | Drug substance:polymer carrier |
| Lactose | 38 | Soluble filler |
| Crospovidone | 10 | Disintegrant |
| CSD | 1 | Glidant |
| SSF | 1 | lubricant |

TABLE 4B

| Formulation 4B (Tablet 2) | | |
|---|---|---|
| Component | % w/w | Function |
| Extrudate (15:85 Compound 1:Soluplus) | 50 | Drug substance:polymer carrier |
| Mannitol | 30.4 | Soluble filler |
| DCPA | 7.6 | Soluble filler |
| Crospovidone | 10 | Disintegrant |
| CSD | 1 | Glidant |
| SSF | 1 | lubricant |

TABLE 4C

| Formulation 4C (Tablet 3) | | |
|---|---|---|
| Component | % w/w | Function |
| Extrudate (15:85 Compound 1:Soluplus) | 50 | Drug substance:polymer carrier |
| Mannitol | 19 | Soluble filler |
| MCC | 19 | Insoluble filler |
| Crospovidone | 10 | Disintegrant |
| CSD | 1 | Glidant |
| SSF | 1 | lubricant |

Extrudate particle size (μm): $D_{0.5}$ = 47.6; $D_{0.9}$ = 194
Tablet disintegration time < 1 min

TABLE 4D

| Formulation 4D (Tablet 4) | | |
|---|---|---|
| Component | % w/w | Function |
| Extrudate (15:85 Compound 1:Soluplus) | 70 | Drug substance:polymer carrier |
| Mannitol | 14.4 | Soluble filler |
| DCPA | 3.6 | Soluble filler |
| Crospovidone | 10 | Disintegrant |
| CSD | 1 | Glidant |
| SSF | 1 | lubricant |

Tablets 1-4 achieved less than 70% release within 30 min, and a maximum of ~80% release within 90 min. See FIG. 3.

Example 3: Dog Study 1

Figure 4A:
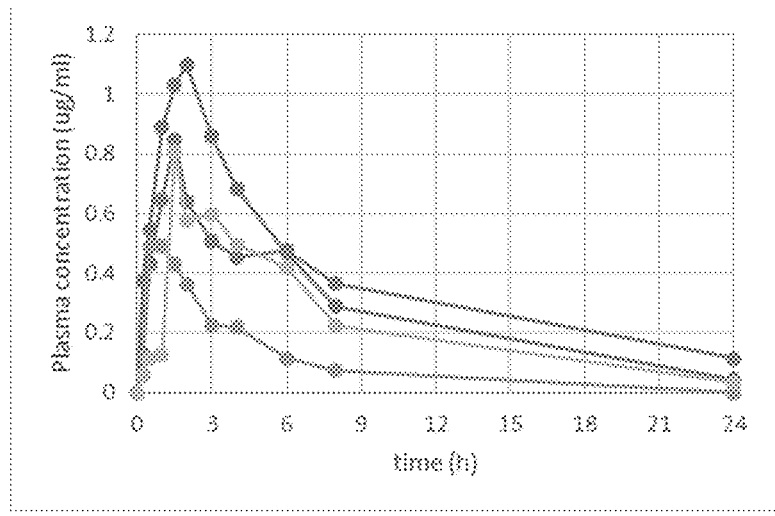
FIGS. 4A-4C are graphs showing time courses of API plasma concentration in dogs of Formulation 1 (FIG. 4A), Formulation 3 (FIG. 4b), and Formulation 4C (FIG. 4C).
Figure 4B:
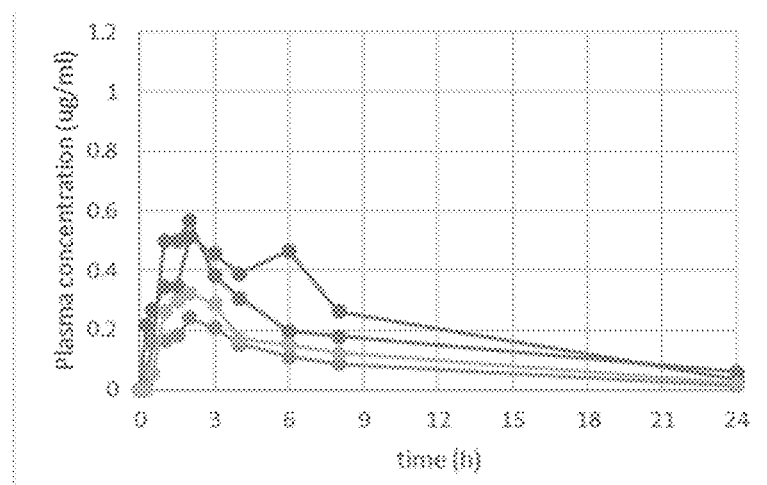
Figure 4C:
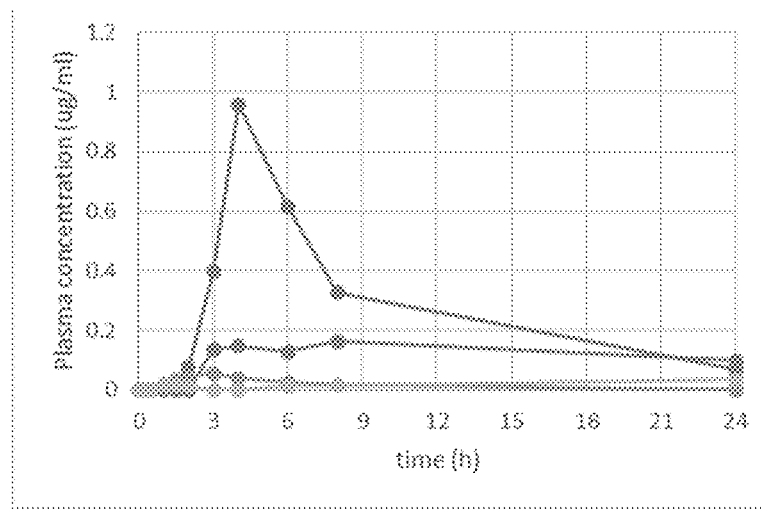

Pharmacokinetic parameters of Formulation 1 (FIG. 4A) and Formulation 3 (FIG. 4B) and Formulation 4C (FIG. 4C) were compared in dogs. Formulation 4C showed poor and inconsistent pharmacokinetics. Results for Formulations 1 and 3 are summarized in Table 4, expressed as relative ratios for Formulation 3:Formulation 1.

TABLE 4

| Dog study 1 | | | |
|---|---|---|---|
| Animal | Rel Cmax* | Rel AUC 0-t* | Rel AUC 0-inf* |
| 1 | 0.74 | 0.61 | 1.04 |
| 2 | 0.52 | 0.78 | 0.81 |
| 3 | 0.54 | 0.91 | 0.98 |
| 4 | 0.44 | 0.54 | 0.68 |
| Average | | 0.71 | 0.89 |

Formulation 3 had lower exposure compared to Formulation 1. Possible causes were surmised to be:
- Aggregation of Formulation 3 in stomach and small intestine leading to decreased dissolution rate which limits absorption.
- The excipients of Formulation 1 provided additional solubilisation of Compound 1 which increased transport to cell wall (Ullevi effect).
- The excipients of Formulation 1 enhanced absorption of Compound 1.

Example 4: Process Flow for Pellets

Figure 5:
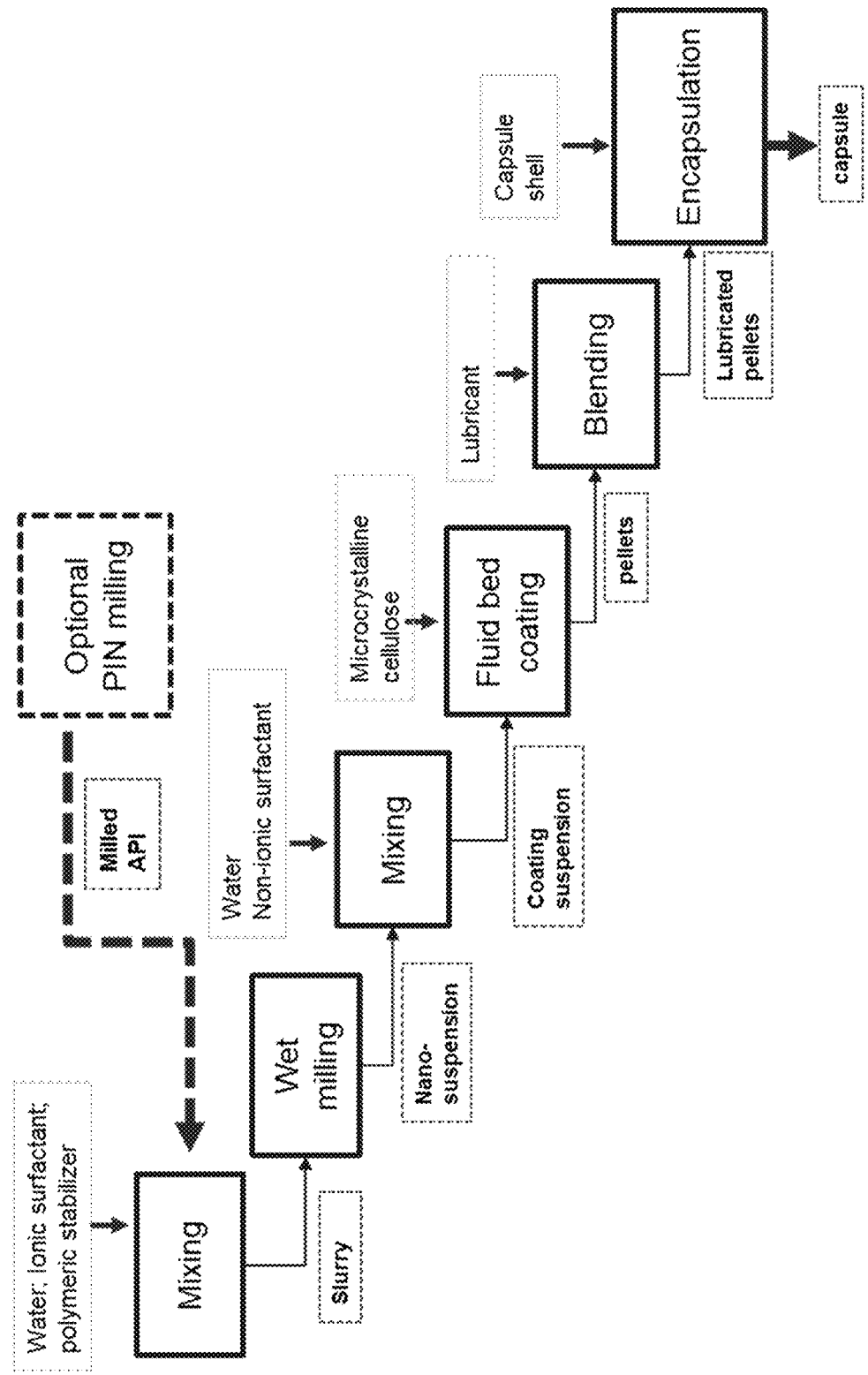

FIG. 5 illustrates the process flow for manufacture of coated microcrystalline pellets, and, where applicable, subsequent loading of the pellets into capsules. Initially, the API (Compound 1) can be dry milled in an optional pin milling process. The milled Compound 1 was then mixed with water, ionic surfactant, and polymeric stabilizer to form a slurry. The slurry was wet milled, yielding a nanosuspension. The nanosuspension was then mixed with additional water and non-ionic surfactant. The resulting suspension was then coated on microcrystalline cellulose in a fluid bed coating process. The pellets can then be used as-is, or where applicable, further processed for loading in capsules. For capsule loading, pellets were blended with lubricant (e.g., sodium stearyl fumarate or magnesium stearate) prior to capsule filling.

Example 5: Formulation 5 Pellets

A pellet formulation (Formulation 5) was developed based on Formulation 3, changing DSPE-PEG2000 for Poloxamer 407, and adjusting ratios of components. Formulation 5 was then formed into pellets by coating on microcrystalline cellulose.

TABLE 5

| Formulation 5 | |
|---|---|
| Pellet coating suspension composition (dry based) | % w/w |
| Compound 1 | 31.9 |
| PVP K30 | 4.1 |
| Docusate Sodium | 0.2 |
| Poloxamer 407 | 31.9 |
| Trehalose | 31.9 |

Example 6: Microcrystalline Cellulose Nanopellet

Following the method of Example 4, a coating suspension was prepared (Formulation 6), and coated on to microcrystalline cellulose (Vivapur 350, approx. particle size 450 μm) in a fluid-bed coating process, either as-is (Formulation 7a)

or with trehalose (Formulation 7b). Suitable particle sizes for milled API are particles $D_{90}$<5 μm and $D_{50}$<2 μm, and smaller.

TABLE 6

Formulation 6

| Component | % w/w | Function |
|---|---|---|
| Compound 1 | 54.44 | Drug substance |
| PVP K30 | 7.08 | Polymeric stabilizer |
| Sodium Docusate | 0.38 | Ionic surfactant |
| Poloxamer 407 | 38.1 | Non-ionic surfactant |

TABLE 7

Formulation 7a and Formulation 7b

| Component | 7a, % w/w | 7b, % w/w | Function |
|---|---|---|---|
| API, % | 36.29 | 25.28 | Drug substance |
| PVP K30, % | 4.72 | 3.29 | Polymeric stabilizer |
| Sodium Docusate | 0.25 | 0.177 | Ionic surfactant |
| Poloxamer 407 | 25.40 | 25.28 | Non-ionic surfactant |
| Trehalose | 0.00 | 12.641 | Matrix former |
| mcc pellets | 33.33 | 33.33 | Pellet core |

The pellets of Formulations 7a and 7b were blended with lubricant (sodium stearyl fumarate) according to Formulations 8a and 8b and loaded encapsulated in a gelatin capsule, with a dose of 50 mg of Compound 1 per capsule.

TABLE 8

Formulation 8a and Formulation 8b

| Component | 8a, % w/w | 8b, % w/w | Function |
|---|---|---|---|
| Compound 1 | 36.220 | 25.232 | Drug substance |
| PVP K30 | 4.709 | 3.28 | Polymeric stabilizer |
| sodium docusate | 0.254 | 0.177 | Ionic surfactant |
| Poloxamer 407 | 25.354 | 25.232 | Non-ionic surfactant |
| trehalose | 0.000 | 12.616 | Matrix former |
| mcc pellets | 33.263 | 33.263 | Pellet core |
| sodium stearyl fumarate | 0.200 | 0.200 | Lubricant |

Example 7: Dog Study 2

Figure 6A:
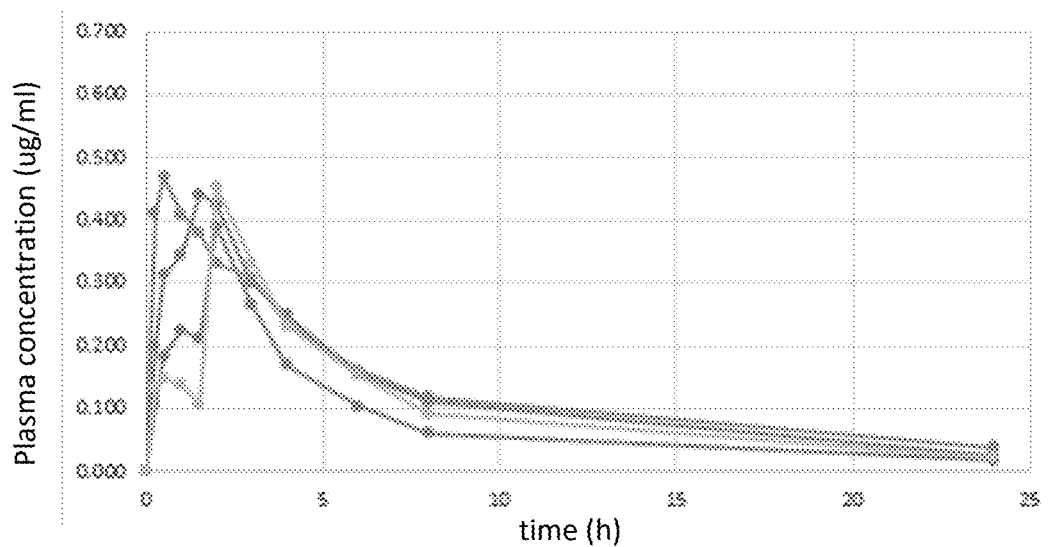
FIGS. 6A-6D are graphs showing time courses of API plasma concentration in dogs of Formulation 1 (FIG. 6A), Formulation 8b (FIG. 6B), Formulation 8a (FIG. 6C), and Formulation 7b (FIG. 6D).
Figure 6B:
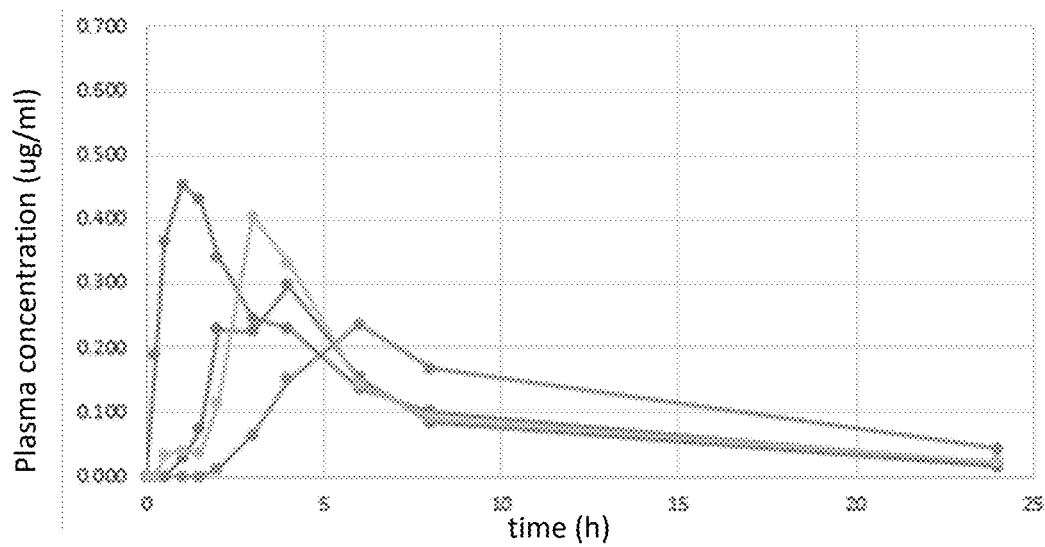
Figure 6C:
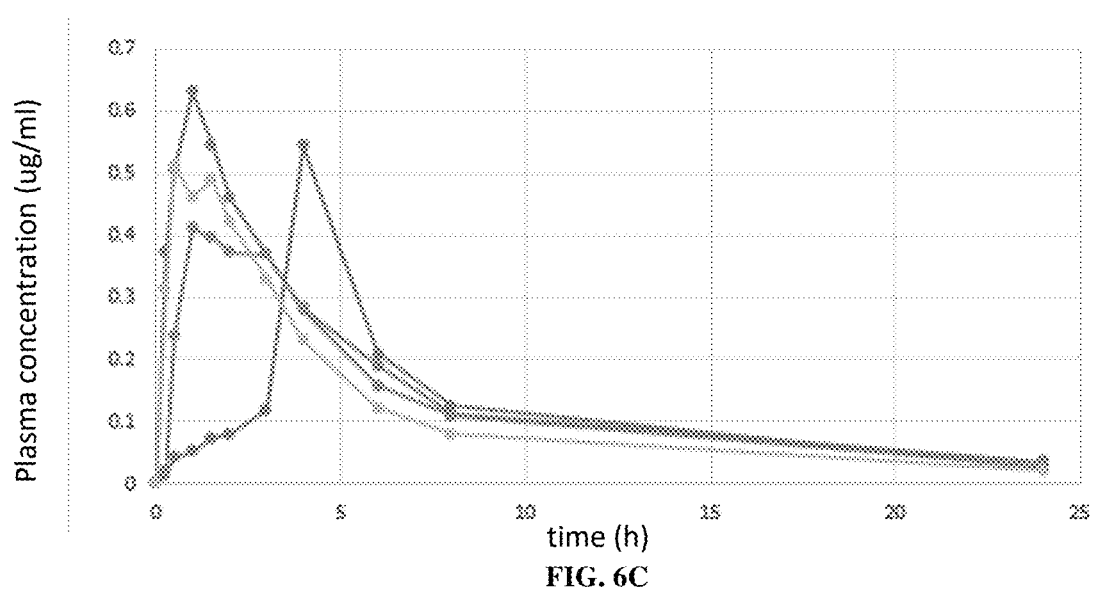
Figure 6D:
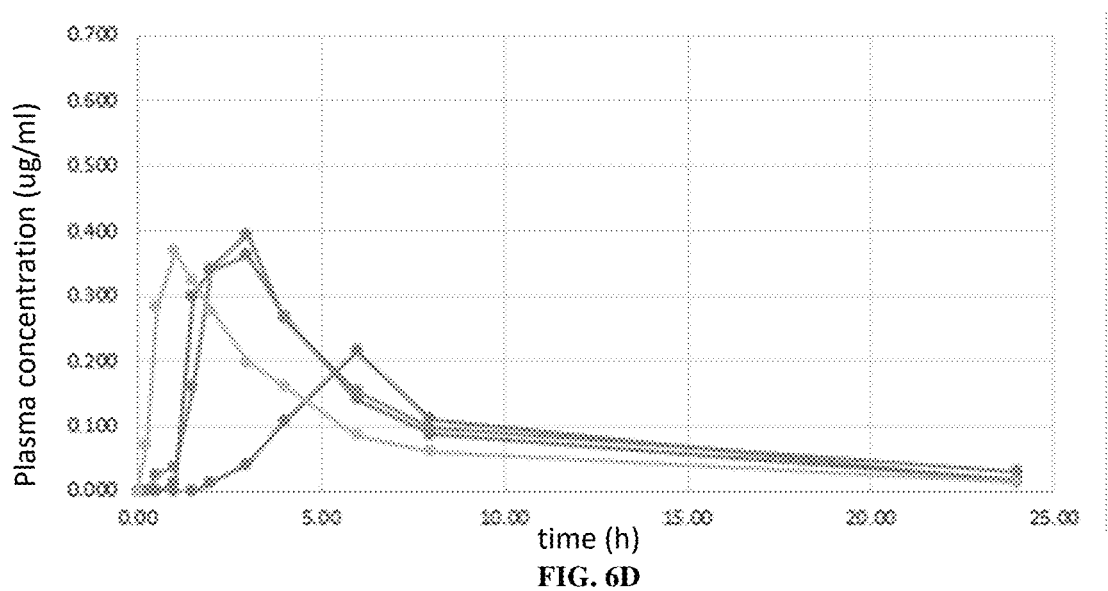

The pharmacokinetic properties of Formulation 1, the capsules of Formulation 8a, the capsules of Formulation 8b, and Formulation 7b as a nanosuspension were measured in dogs (oral dosing, dogs pretreated with omeprazole). Results are summarized in Table 9 (AUC, expressed as $F_{rel}$ % compared to Formulation 1) and Table 10 ($C_{max}$, expressed as % compared to Formulation 1). Time courses are shown in FIG. 6A (Formulation 1), FIG. 6B (Formulation 8b), FIG. 6C (Formulation 8a), and FIG. 6D (Formulation 7b).

TABLE 9

Dog Study 2, AUC $F_{rel}$, %

| | Dog 1 | Dog 2 | Dog 3 | Dog 4 | mean |
|---|---|---|---|---|---|
| 8b | 0.76 | 0.78 | 0.78 | 0.77 | 0.77 |
| 8a | 0.91 | 0.98 | 0.76 | 0.91 | 0.89 |
| 7b | 1.22 | 1.32 | 0.93 | 1.14 | 1.15 |

TABLE 10

Dog Study 2, $C_{max}$, %

| | Dog 1 | Dog 2 | Dog 3 | Dog 4 | mean |
|---|---|---|---|---|---|
| 8b | 0.82 | 0.56 | 0.85 | 0.82 | 0.76 |
| 8a | 1.02 | 0.77 | 0.51 | 0.89 | 0.80 |
| 7b | 1.43 | 1.38 | 0.87 | 1.13 | 1.21 |

Both capsule formulations 8a and 8b had relative AUC>0.7 compared to Formulation 1, and had relative $C_{max}$>0.7 compared to Formulation 1. Formulation 8a showed higher AUC than 8b. In addition, Formulation 8b exhibited degradation when upon storage at temperatures of 50° C. The pellets of Formulation 8a re-dispersed to smaller particles than those of Formulation 8b. Formulation 8a was progressed to a human relative bioavailability study.

Example 8: Human Relative Bioavailability Study

Following administration of AZD4635 nanosuspension (Formulation 1) to human subjects in the fasted state, plasma AZD4635 concentrations were quantifiable from the first sampling time point of 0.25 hour post-dose in all subjects. Thereafter, concentrations remained quantifiable until 24 to 48 hours post-dose. Maximum plasma concentrations occurred between 0.5 hour and 2 hours post-dose (median $t_{max}$ of 1 hour). Geometric mean (CV %) values for $C_{max}$, $AUC_{0-t}$ and AUC were 276 ng/mL (16.7), 1670 ng·h/mL (29.4), and 1760 ng·h/mL (29.8), respectively (see Table 11).

Following administration of AZD4635 solid oral capsule formulation (Formulation 8a capsule) to human subjects in the fasted state, plasma AZD4635 concentrations were quantifiable from between 0.25 hour and 0.5 hour post-dose. Thereafter, concentrations remained quantifiable until the last sampling occasion at 48 hours post-dose. Maximum plasma concentrations occurred between 1 hour and 2 hours post-dose (median $t_{max}$ of 1.5 hours). Geometric mean (CV %) values for $C_{max}$, $AUC_{0-t}$ and AUC were 352 ng/mL (31.0), 1850 ng·h/mL (28.3) and 1940 ng·h/mL (29.0), respectively (see Table 11).

The relative bioavailability of AZD4635 based on $C_{max}$ and $AUC_{0-48}$ were 128% and 110%, respectively. Statistical comparisons of geometric mean ratios (GMRs) for $C_{max}$ and $AUC_{0-48}$ were 126.71% (90% confidence interval [CI]: 111.12% to 144.48%) and 110.21% (104.33% to 116.42%), respectively, indicating the peak and overall exposure levels for the solid oral capsule formulation (Formulation 8a) were on average 27% and 10% higher than the nanosuspension (Formulation 1). The absorption rate was higher for the solid formulation and resulted in higher peak concentrations.

TABLE 11

Summary of Human Relative Bioavailability Study

| | Nanosuspension (Formulation 1) | Capsule (Formulation 8a) |
|---|---|---|
| $t_{max}{}^a$ (h) | 1.00 (0.50-2.00) | 1.50 (1.00-2.00) |
| $C_{max}$ (ng/mL) | 276 (16.7) | 352 (31.0) |
| $AUC_{0-t}$ (ng · h/mL) | 1670 (29.4) | 1850 (28.3) |
| $AUC_{0-48}$ (ng · h/mL) | 1690 (28.4) | 1860 (27.7) |
| AUC (ng · h/mL) | 1760 (29.8) | 1940 (29.0) |
| $t_{1/2\lambda z}$ (h) | 11.3 (24.9) | 11.4 (20.7) |
| $F_{rel} C_{max}$ (%) | — | 128 (33.6) |
| $F_{rel} AUC_{0-t}$ (%) | — | 110 (12.5) |

TABLE 11-continued

Summary of Human Relative Bioavailability Study

| | Nanosuspension (Formulation 1) | Capsule (Formulation 8a) |
|---|---|---|
| $F_{rel}$ AUC$_{0-48}$ (%) | — | 111 (12.9) |
| $F_{rel}$ AUC (%) | — | 110 (12.9) |

$^a$ Median(range)
$t_{max}$ = time of maximum observed concentration sampled during a dosing interval
$C_{max}$ = maximum concentration occurring at $t_{max}$
AUC$_{0-t}$ = area under the drug concentration-time curve from zero to last time point
AUC$_{0-48}$ = area under the drug concentration-time curve from zero time to 48 hours
AUC = area under the drug concentration-time curve
$t_{1/2\lambda z}$ = half-life associated with the z component of a polyexponential equation
$F_{rel}$ = relative bioavailability Other embodiments are within the scope of the following claims.

What is claimed is:

1. A solid pharmaceutical formulation comprising a plurality of microcrystalline cellulose pellets each individually coated with a composition comprising:
   6-(2-chloro-6-methylpyridin-4-yl)-5-(4-fluorophenyl)-1,2,4-triazin-3-amine;
   a polymeric stabilizer;
   an ionic surfactant; and
   a non-ionic surfactant.

2. The formulation of claim 1, wherein:
   the polymeric stabilizer comprises polyvinylpyrrolidone;
   the ionic surfactant comprises sodium docusate; and
   the non-ionic surfactant comprises a poloxamer or a polyethylene glycolated phospholipid.

3. The formulation of claim 1, wherein:
   the polymeric stabilizer is polyvinylpyrrolidone K-30;
   the ionic surfactant is sodium docusate; and
   the non-ionic surfactant is poloxamer 407.

4. The formulation of claim 1, wherein the composition further comprises trehalose.

5. The formulation of claim 1, wherein the composition comprises, on a w/w % basis:
   from 20 to 75% of 6-(2-chloro-6-methylpyridin-4-yl)-5-(4-fluorophenyl)-1,2,4-triazin-3-amine;
   from 1 to 20% of polyvinylpyrrolidone K-30;
   from 0.01 to 1.00% of sodium docusate; and
   from 20 to 60% of poloxamer 407.

6. The formulation of claim 1, wherein the formulation includes, on a w/w % basis:
   from 10 to 50% of microcrystalline cellulose;
   from 20 to 50% of 6-(2-chloro-6-methylpyridin-4-yl)-5-(4-fluorophenyl)-1,2,4-triazin-3-amine;
   from 0.1 to 10% of polyvinylpyrrolidone K-30;
   from 0.01 to 1.00% of sodium docusate; and
   from 10 to 40% of poloxamer 407.

7. The formulation of claim 1, wherein the formulation further comprises a lubricant.

8. The formulation of claim 7, wherein the lubricant comprises sodium stearyl fumarate.

9. The formulation of claim 7, wherein the formulation comprises, on a w/w % basis:
   from 25 to 40% of microcrystalline cellulose;
   from 25 to 45% of 6-(2-chloro-6-methylpyridin-4-yl)-5-(4-fluorophenyl)-1,2,4-triazin-3-amine;
   from 3 to 7% of polyvinylpyrrolidone K30;
   from 0.05 to 0.50% of sodium docusate;
   from 15 to 35% of poloxamer 407; and
   from 0.01 to 0.5% of sodium stearyl fumarate.

10. The formulation of claim 1, wherein the formulation comprises, on a w/w % basis:
    from 30 to 35% of microcrystalline cellulose;
    from 33 to 39% of 6-(2-chloro-6-methylpyridin-4-yl)-5-(4-fluorophenyl)-1,2,4-triazin-3-amine;
    from 4.2 to 5.2% of polyvinylpyrrolidone K30;
    from 0.2 to 0.3% of sodium docusate;
    from 22 to 28% of poloxamer 407; and
    from 0.15 to 0.25% of sodium stearyl fumarate.

11. The formulation of claim 1, wherein the composition consists of, on a w/w % basis:
    54.44% of 6-(2-chloro-6-methylpyridin-4-yl)-5-(4-fluorophenyl)-1,2,4-triazin-3-amine;
    7.08% of polyvinylpyrrolidone K30;
    0.38% of sodium docusate; and
    38.1% of poloxamer 407.

12. The solid pharmaceutical formulation of claim 1, which comprises 6-(2-chloro-6-methylpyridin-4-yl)-5-(4-fluorophenyl)-1,2,4-triazin-3-amine, wherein an oral dose of 50 mg of 6-(2-chloro-6-methylpyridin-4-yl)-5-(4-fluorophenyl)-1,2,4-triazin-3-amine to a human subject provides an AUC$_{0-48}$ of 1850 ng·h/mL±30%.

13. The solid pharmaceutical formulation of claim 1, which comprises 6-(2-chloro-6-methylpyridin-4-yl)-5-(4-fluorophenyl)-1,2,4-triazin-3-amine, wherein an oral dose of 50 mg of 6-(2-chloro-6-methylpyridin-4-yl)-5-(4-fluorophenyl)-1,2,4-triazin-3-amine to a human subject provides a $C_{max}$ of 352 ng/mL±30%.

14. The formulation of claim 12, wherein an oral dose of 50 mg of 6-(2-chloro-6-methylpyridin-4-yl)-5-(4-fluorophenyl)-1,2,4-triazin-3-amine to a human subject provides an AUC$_{0-48}$ of 1850 ng·h/mL±30% and a $C_{max}$ of 352 ng/mL±30%.

15. A solid unit dosage form of 6-(2-chloro-6-methylpyridin-4-yl)-5-(4-fluorophenyl)-1,2,4-triazin-3-amine comprising the formulation according to claim 1, wherein the unit dosage form comprises from 1 mg to 200 mg of 6-(2-chloro-6-methylpyridin-4-yl)-5-(4-fluorophenyl)-1,2,4-triazin-3-amine in a gelatin capsule.

16. A solid unit dosage form of 6-(2-chloro-6-methylpyridin-4-yl)-5-(4-fluorophenyl)-1,2,4-triazin-3-amine comprising the formulation according to claim 1, wherein the unit dosage form comprises 50 mg, or 70 mg, or 100 mg of 6-(2-chloro-6-methylpyridin-4-yl)-5-(4-fluorophenyl)-1,2,4-triazin-3-amine in a gelatin capsule.

* * * * *